United States Patent [19]

Butter et al.

[11] Patent Number: 5,390,423
[45] Date of Patent: Feb. 21, 1995

[54] ANALOGUE PROBE

[75] Inventors: Andrew G. Butter; Adrian C. Welsford; David G. Powley, all of Bristol, United Kingdom

[73] Assignee: Renishaw plc, Gloucestershire, United Kingdom

[21] Appl. No.: 214,239

[22] Filed: Mar. 17, 1994

Related U.S. Application Data

[63] Continuation-in-part of Ser. No. 34,770, Mar. 19, 1993, which is a continuation-in-part of Ser. No. 643,373, Jan. 21, 1991, Pat. No. 5,212,873.

[51] Int. Cl.⁶ .............................................. G01B 5/20
[52] U.S. Cl. ........................................ 33/559; 33/556
[58] Field of Search ................. 33/559, 561, 556, 558, 33/707, 557, 560; 73/865.8; 356/374

[56] References Cited

U.S. PATENT DOCUMENTS

| | | | |
|---|---|---|---|
| 3,869,799 | 3/1975 | Neuer et al. | 33/560 |
| 3,946,492 | 3/1976 | DuBose, Jr. | 33/558 |
| 3,957,378 | 5/1976 | Zipin | 356/374 |
| 4,084,323 | 4/1978 | McMurty | |
| 4,130,941 | 12/1978 | Amsbury | 33/558 |
| 4,158,919 | 6/1979 | McMurtry | |
| 4,523,382 | 6/1985 | Werner et al. | 33/561 |
| 4,523,383 | 6/1985 | Rogers et al. | |
| 4,530,159 | 7/1985 | Ernst | 33/559 |
| 4,578,873 | 4/1986 | Klingler et al. | 33/559 |
| 4,611,403 | 9/1986 | Morita et al. | 33/561 |
| 4,621,434 | 11/1986 | Hirschmann | 33/558 |
| 4,716,656 | 1/1988 | Maddock et al. | 33/559 |
| 4,899,456 | 2/1990 | Morita et al. | 33/559 |
| 4,937,948 | 7/1990 | Herzog et al. | 33/561 |
| 4,942,671 | 7/1990 | Enderle et al. | 33/559 |
| 5,048,194 | 9/1991 | McMurty | 33/558 |
| 5,083,379 | 1/1992 | Enderle et al. | 33/556 |
| 5,119,568 | 6/1992 | Vesco et al. | 33/561 |
| 5,212,873 | 5/1993 | McMurty | 33/561 |

FOREIGN PATENT DOCUMENTS

| | | | |
|---|---|---|---|
| 0284737 | 10/1988 | European Pat. Off. | |
| 0422530 | 4/1991 | European Pat. Off. | |
| 3234471 | 8/1983 | Germany | |
| 0093202 | 6/1982 | Japan | 33/356 |
| 2112139 | 7/1983 | United Kingdom | |
| 2163256 | 2/1986 | United Kingdom | |
| 8400605 | 2/1984 | WIPO | |
| 9004149 | 4/1990 | WIPO | |

*Primary Examiner*—Thomas B. Will
*Attorney, Agent, or Firm*—Oliff & Berridge

[57] ABSTRACT

An analogue probe 100 includes a fixed structure 110 and a stylus supporting member 112 suspended relative to the fixed structure 110 by three serially connected pairs of leaf springs 114,116,118. Displacement of the supporting member 112 relative to the fixed structure 110 is transduced by three opto-electronic scale and readhead transducers 136,144;138,146;140,148. The distorting effect of bending moments applied to the tip 130 of the stylus 128 upon leaf springs 114,118 is counteracted by an increased spacing between upper ends of leaf springs of a given pair, relative to the spacing between leaf springs at their lower ends; the resulting arrangement forming a trapezium as opposed to a rectangle. This enables longer styli to be employed before distortion of the leaf springs causes failure of the opto-electronic transducers due to unwanted tilting of the supporting member 112.

4 Claims, 5 Drawing Sheets

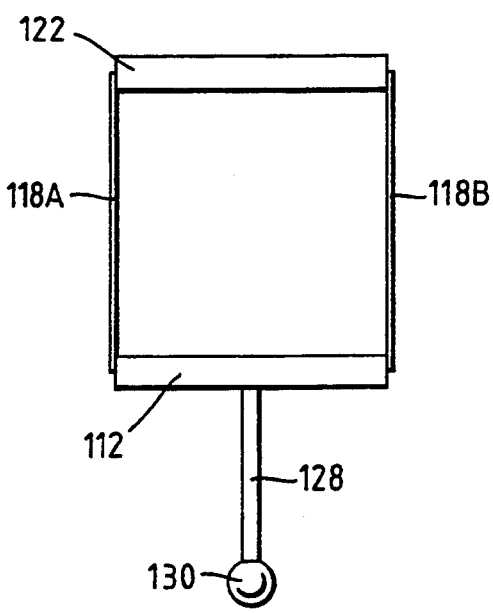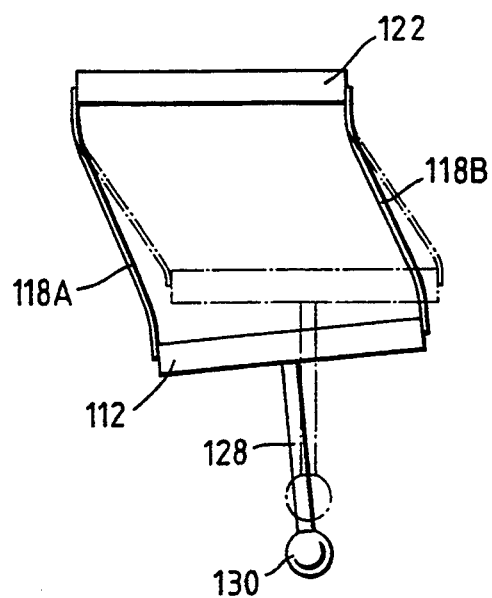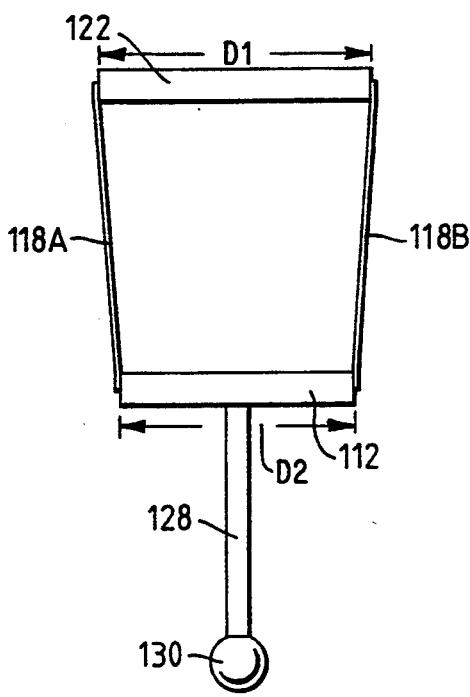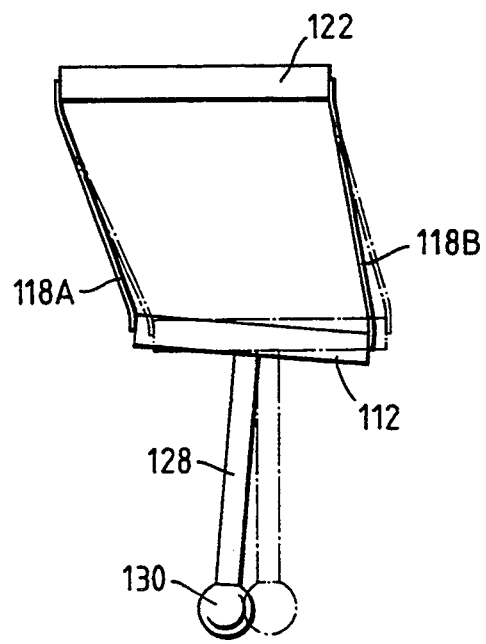

16
ANALOGUE PROBE

RELATED APPLICATIONS

This application is a continuation-in-part of Ser. No. 08/034,770, filed on Mar. 19th, 1993, pending which in turn was a continuation-in-part of Ser. No. 07/643,373, filed on Jan. 21st, 1991, now U.S. Pat. No. 5,212,873.

BACKGROUND TO THE INVENTION

1. Field of the Invention

The invention relates to an analogue, scanning or measurement probe used on a coordinate positioning machine such as a coordinate measuring machine or machine tool, to measure the position or contour of a surface.

Coordinate positioning machines are known, and include an arm and a table movable relative to each other with three linear degrees of freedom, together with three transducers which measure displacement of e.g. the arm relative to a reference position on the table. An analogue probe used on such a machine typically comprises a fixed structure, by which the probe is supported on the arm, and a movable supporting member suspended relative to the fixed structure by an assembly permitting movement of the supporting member relative to the fixed structure with three degrees of freedom. One known form of suspension assembly includes three serially mounted pairs of leaf springs which permit substantially linear movement (over a relatively small distance) of the supporting member in three substantially orthogonal directions. The displacement of the supporting member relative to the fixed structure (and therefore the movable arm of the machine, as well as, by implication, the table) is measured by three transducers within the probe, each of which includes a detector provided on the fixed structure for sensing displacement of a body rigidly connected with the movable supporting member.

In use, the movable supporting member carries an elongate stylus having a spherical sensing tip at its free end, and the machine is operated to cause relative movement between the table and the arm in order to bring the sensing tip of the stylus into contact with the surface whose position or contour is being measured. The instantaneous position of the spherical sensing tip (and therefore of any surface in contact therewith) is determined relative to the reference on the table by summing the outputs of the corresponding transducers in the probe and on the machine. Machines equipped in this way may be used to measure the position of a single point, or, alternatively, to trace the contour of the surface by operating the machine to cause relative movement between the table and the arm while maintaining contact between the sensing tip of the stylus and the surface.

2. Description of Related Art

In a preferred form of analogue probe, the transducers in the probe are provided by an optical scale rigidly connected to the movable supporting member, and an opto-electronic readhead provided on the fixed structure which measures displacement of the scale in a given direction. A problem exists however in particular with analogue probes which employ transducers of this type in conjunction with suspension assemblies of the type described above, i.e. suspension assemblies which include a plurality of pairs of parallel leaf springs, where the stylus connected to the movable supporting member is relatively long. The bending moment applied to the movable supporting member as a result of lateral forces at the sensing tip of the stylus increases with stylus length. This bending moment is inevitably transmitted to the leaf springs of the suspension assembly for the supporting member. Large bending moments at the movable supporting member therefore cause deformations of the leaf springs in the suspension assembly to the extent that the supporting member undergoes a small scale rotation in addition to the translational displacement as a result of forces applied to the sensing tip of the stylus (as a result of contact with a component under inspection). This rotation of the movable supporting member in turn causes a corresponding tilting of the optical scales connected thereto. Tilting of the scale beyond a certain angle and in a particular direction relative to its corresponding opto-electronic readhead results in a failure of the transducer. This phenomenon therefore places a practical limit on the length of styli which may be carried by the movable supporting member, and therefore a significant restriction on the different inspection tasks which may be performed.

SUMMARY OF THE INVENTION

The present invention seeks to ameliorate this problem by providing a probe for a coordinate positioning machine, the probe including a suspension assembly comprising:

a first, relatively fixed, member;
a second, relatively movable, member;
a pair of leaf springs, each leaf spring of said pair being connected to said first and second member to enable an arcuate motion of said second member in a plane extending substantially orthogonal to the plane of each of said leaf springs; wherein the distance, measured in said plane, between the leaf springs at the first member is greater than the distance, measured in said plane between the leaf springs at said second member, thereby to induce a rotation of said second member upon said arcuate motion thereof relative to the first member, said rotation having an axis orthogonal to said plane, and occurring in a sense opposite to that of said arcuate motion.

BRIEF DESCRIPTION OF DRAWINGS

Embodiments of the invention will now be described, with reference to the accompanying drawings, in which:

FIGS. 5A and B illustrate operation of a prior art probe using parallel leaf springs;
FIGS. 6A and B illustrate an improvement to the arrangement of FIGS. 5A and B.

DESCRIPTION OF PREFERRED EMBODIMENTS

Figure 1:
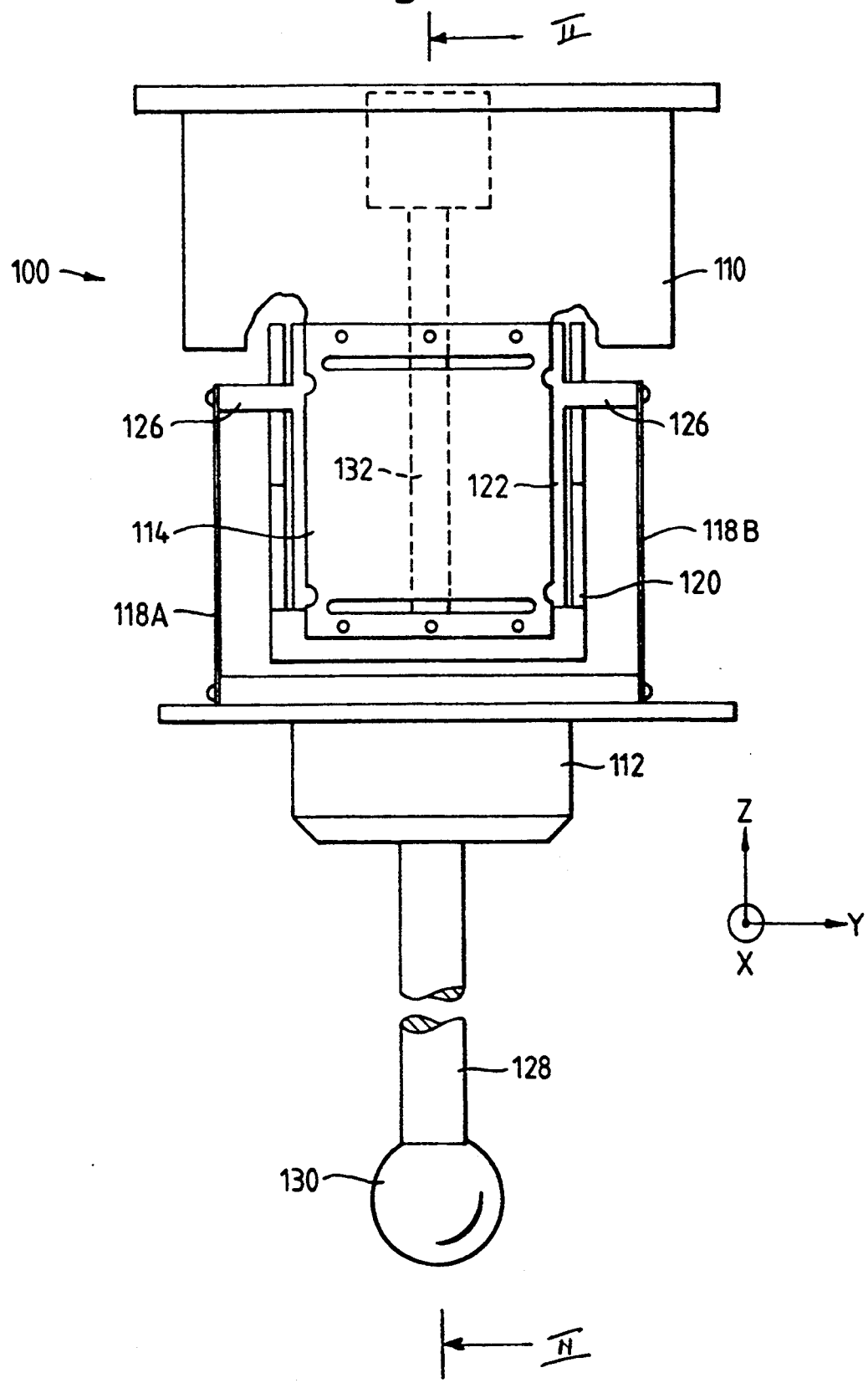
FIG. 1 is a section through an embodiment of probe according to the present invention.
Figure 2:
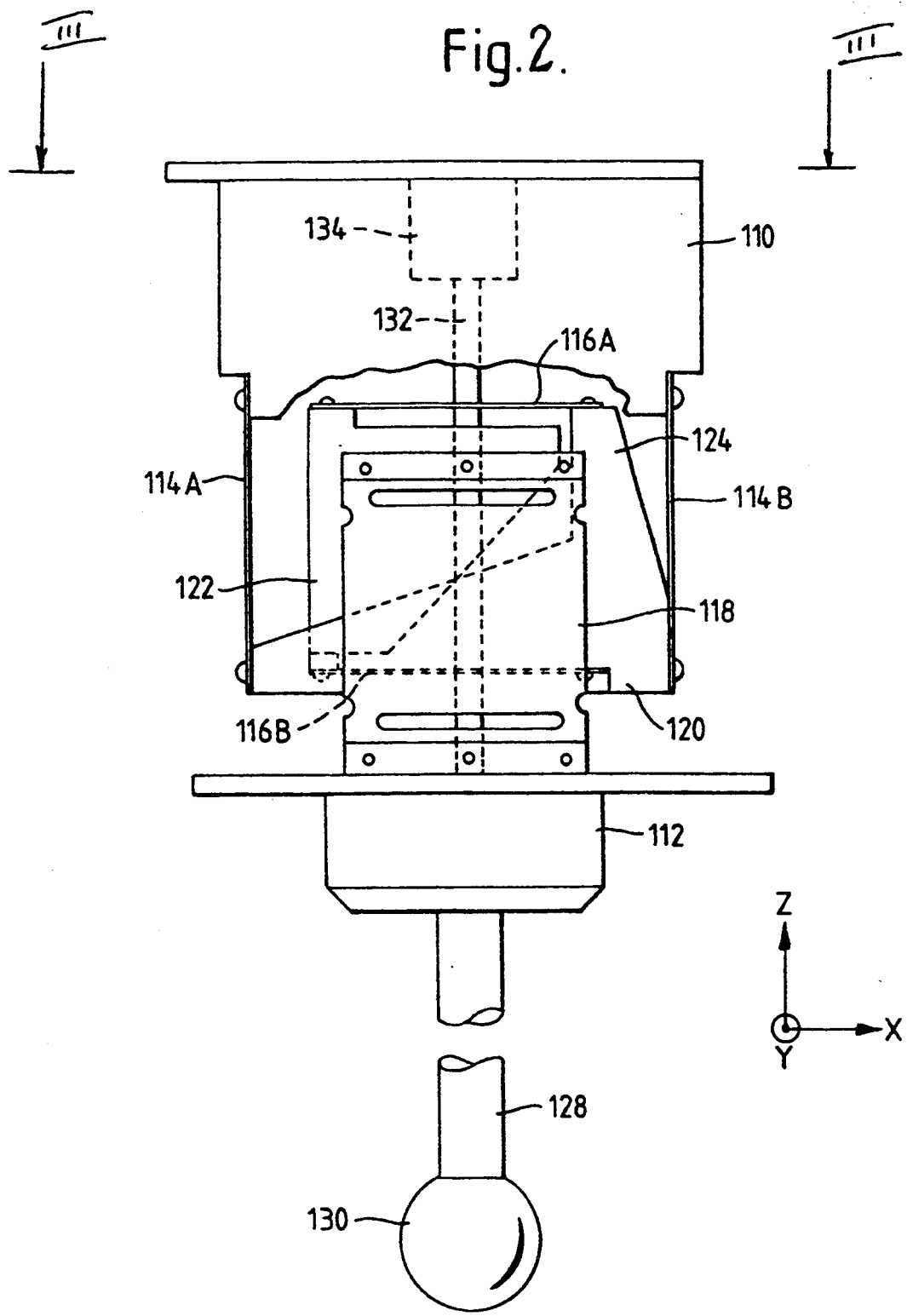
FIG. 2 is a section on the line II—II in FIG. 1.

Referring to FIGS. 1 and 2 a probe 100 has a fixed structure 110, and a stylus supporting member 112 suspended relative to the fixed structure 110 by three serially connected pairs of leaf springs 114,116,118. The pairs of leaf springs 114,116,118 permit translations of the stylus supporting member 112 relative to the fixed structure 110 in the X,Z, and Y directions respectively, thus providing three translational degrees of freedom for the stylus supporting member 112. Leaf springs 114A,B, spaced apart in the X direction and extending in substantially parallel YZ planes, are connected at their upper end to the fixed structure 110, and at their lower end to a first intermediate member 120. Leaf springs 116A,B are spaced apart in the Z direction and extend in parallel XY planes. Leaf spring 116A is connected at one end to an upwardly extending limb 124 on the first intermediate member 120, and at the other end to a second intermediate member 122. Leaf spring 116B is connected at one end to the first intermediate member 120 and at the other end to the second intermediate member 122. The configuration of the first and second intermediate members 120,122 is such that the second intermediate member 122 is nested within the structure of the first intermediate member 120, as shown in FIG. 1. Leaf springs 118A,B, spaced apart in the Y direction and extending in substantially parallel XZ planes are connected at their upper end to outwardly extending arms 126 provided on the second intermediate member 122, and at their lower end to the stylus supporting member 112. Movements of the first intermediate member 120 relative to the fixed structure 110, second intermediate member 122 relative to the first intermediate member 120, and stylus supporting member 112 relative to the second intermediate member 122 provided by leaf springs 114,116,118 respectively are arcuate translations in the XZ,XZ and YZ planes respectively (although this approximates to linear translation where the displacements are small). The relative stiffness of the leaf springs 114,116,118 to forces applied thereto in the YZ,XY and XZ planes respectively prevents, to a first approximation, rotation of the stylus supporting member 112. The stylus supporting member 112 supports an elongate stylus 128 having a substantially spherical sensing tip 130 at its free end.

In use, the fixed structure 110 is mounted to the movable arm of a coordinate positioning machine, and the arm is driven until the sensing tip 130 of the stylus 128 comes into contact with a surface whose position or contour is to be measured. The leaf springs 114,116,118 and intermediate members 120,122 permit displacement of the stylus supporting member 112 (and thus the stylus 128) relative to the fixed structure 110 upon contact of the sensing tip 130 with the surface. Transducers within the probe measure this displacement relative to a reference position, or datum, on the fixed structure. The position of the surface is thus determined relative to a reference on the table of the machine by summing the transducer outputs of the machine, which measure the position of the movable arm relative to the reference on the table, with the outputs of the transducers in the probe, which measure the displacement of the sensing tip 130 relative to a reference on the fixed structure (and thus the movable arm).

Figure 3:
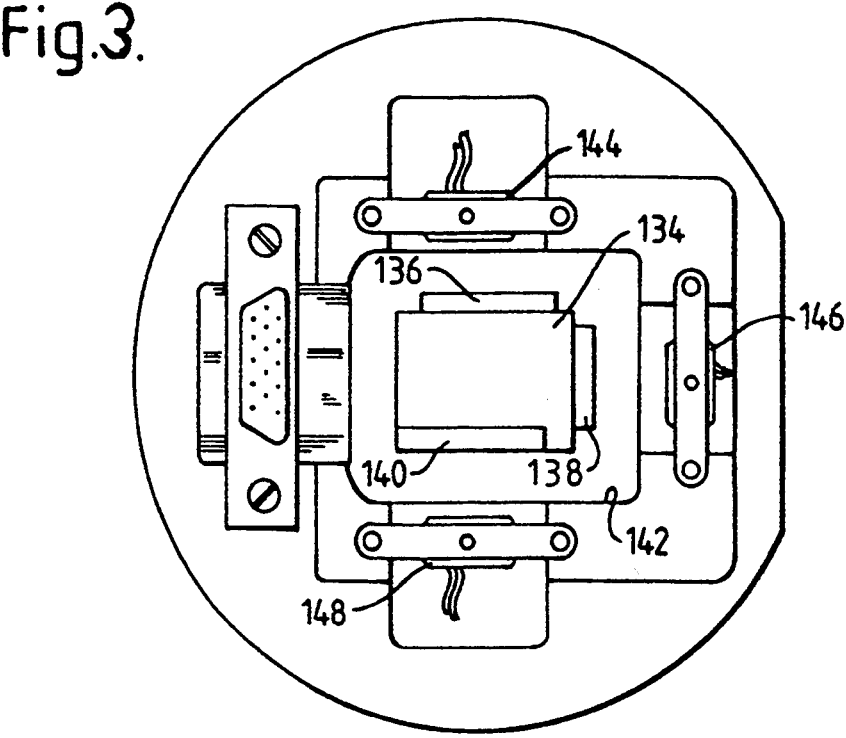
FIG. 3 is a section on the line III—III in FIG. 2.

Referring now additionally to FIG. 3, the stylus supporting member 112 is connected to an elongate stem 132, which extends through apertures (not shown) in leaf springs 116A,B. The distal end of the stem 132 supports a cube 134 on which three scales 136,138,140 are mounted. The scales 136,138 have lines extending in the Z direction and are mounted in XZ and YZ planes respectively; the scale 140 has lines extending in the X direction and is mounted on the cube 134 in an XZ plane. The cube 134 thus moves within cavity 142, provided in the fixed structure 110, with movements which correspond exactly to the movements of the stylus supporting member 112, and to a first order approximation, the sensing tip 130 of the stylus 128.

Readheads 144,146,148 are mounted on the fixed structure 110 in register with the scales 136,138,140 respectively, and co-operate with the scales to measure displacement of the cube 134 within the cavity 142 in the X,Y and Z directions respectively. The readheads 144,146,148 detect any displacement of the scales 136,138,140 in a direction perpendicular to the spacing of the lines of each of the scales, but are insensitive to any movement of the scale either in a direction perpendicular to the plane of the scale, or along the direction of the lines of the scale. The alignment of the lines on the scale about an axis extending between the scale and the corresponding readhead thus determines the alignment of the measuring axes of the probe, whereas the straightness of the lines of each of the scales 136,138,140 determines the straightness of the measuring axes of the probe.

Figure 4:
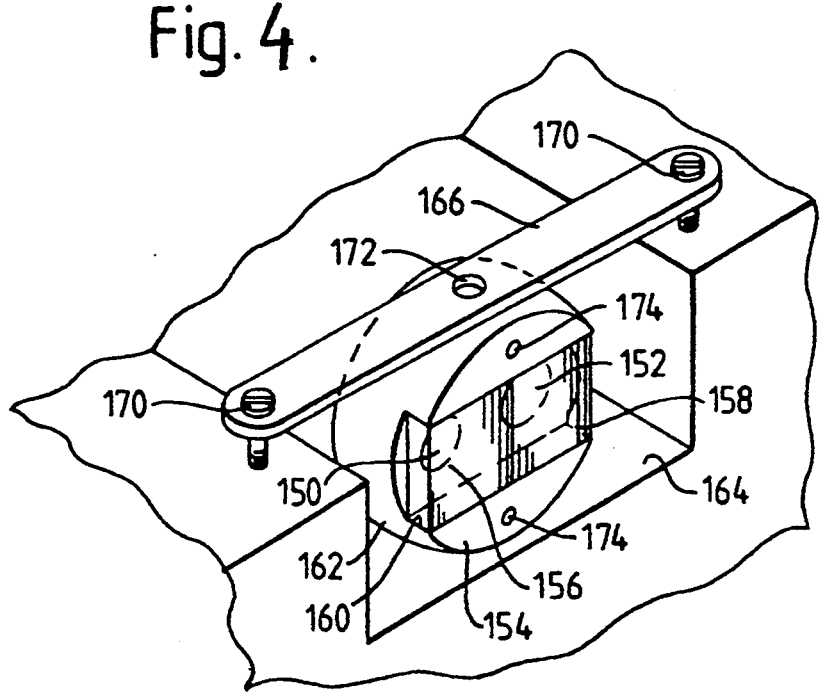
FIG. 4 is a detail of FIG. 3.

Referring now to FIG. 4, each of the readheads 144,146,148 includes a light source 150 and three detectors provided in a single unit 152, supported in a readhead housing 154. Light from the light source 150 passes through an index grating 156, is reflected off the scale, to pass into the detector unit 152 via an analyser grating 158. The index and analyser grating 156,158 are provided on a single glass substrate which is supported in a channel 160 provided in the readhead housing 154. The readhead housing 154 has an outer periphery 162 whose surface is spherical, and the readhead is retained in a channel 164 in the fixed structure 110. The readhead housing 154 is retained in the channel by means of a retention bar 166, which is secured to the fixed structure on either side of the channel by means of bolts 170. The retention bar 166 includes an aperture 172 which engages the spherical periphery of the readhead housing 154; a similar aperture (not shown) is provided in the base of the channel 164, and in register with the aperture 172. This arrangement enables adjustment of the attitude of the housing 154 relative to the adjacent scale on the cube 134, while the apertures which engage the periphery of the housing 154 prevent translation thereof. In this way, the pitch, roll and yaw of the housing about three perpendicular axes (all of which intersect at a common point coincident with the centre of the spherical periphery 162) may be adjusted to obtain optimum performance of the scale and readhead transducer. Adjustment of the housing position may be performed by a suitable tool having a pair of spaced-apart prongs each of which is engageable in a tooling hole 174. Pivoting of the tool while the prongs are engaged will thus rotate the housing 154 about the required axis. When the requisite alignment of the readhead and the scale has been obtained the bolts 170 may be tightened to such an extent that the friction between the retaining bar 166, the periphery 162 of the housing 154, and the base of the channel 164 is such that the housing cannot easily be moved.

As mentioned above, the relative stiffness of the pairs of leaf springs 114,116,118 to forces applied in certain directions resists rotation of the stylus supporting member 112. However, if a force is applied to the sensing tip 130 of the stylus 128 in e.g. the Y direction, the leaf springs 118 are subjected to a bending moment whose magnitude is proportional to the length of the stylus and the force applied to the sensing tip 130 in the Y direction (which is in turn inevitably proportional to the deflection of the sensing tip from its rest position). Referring now to FIGS. 5A and 5B, a force applied to the sensing tip 130 in the positive Y direction will apply a bending moment to the stylus supporting member 112 which is transmitted to the leaf springs 118A,118B. The bending moment has the effect of applying a compressing force to leaf spring 118B and a stretching force to leaf spring 118A. This will result in a minor rotation of the stylus supporting member 112, which rotation increases in magnitude with the increased displacement of the stylus supporting member in the +Y direction. This rotation is illustrated in FIG. 5B, and it can be seen that the rotation occurs in the same sense as the arcuate motion of the supporting member 112 as a result of the displacement thereof, i.e. anticlockwise in FIG. 5B. (Also shown, by way of comparison, in dashed lines, is a probe with "infinitely stiff" leaf springs which provide perfect parallel action.) The rotation of the stylus supporting member 112 will result in a corresponding tilting of the transducer cube 134. Tilting of the cube 134 in the XZ plane beyond a critical angle (of the order of 10 minutes of arc) causes failure of the scale and readhead transducer which measures displacement of the cube in the X direction. This phenomenon thus effectively limits the length of styli which may be carried by the stylus supporting member 112, and therefore the range of inspection tasks which the probe is capable of performing.

A modification to the traditional parallel leaf spring design which overcomes this problem is illustrated in FIGS. 6A and B. Referring to FIG. 6A, it can be seen that the spacing D1 between the leaf springs 118 in the Y direction at the second intermediate member 122 is greater than the spacing D2 between the leaf springs in the Y direction at the stylus supporting member 112. This can be achieved by the use of shims, for example. The second intermediate member 122, stylus supporting member 112 and leaf springs 118 thus define a trapezium, rather than a rectangle as is usual for a parallel leaf spring arrangement. Referring now to FIG. 6B, it can be seen that a displacement of the supporting member in the Y direction will (i.e. an anticlockwise sense), by virtue of the spacing D1 being larger than spacing D2, result in a rotation of the stylus supporting member 112 in a clockwise sense. This "counter-rotation" of the stylus supporting member 112 as a result of the leaf spring configuration effectively counteracts the rotation induced by the bending moment applied to the supporting member 112 by lateral forces acting on the sensing tip 130 which caused the displacement of the supporting member 112. The probe is thus capable of carrying a greater range of lengths of stylus before rotation of the transducer cube 134 causes failure of the probe due to inoperability of the transducers.

This improved leaf spring arrangement is preferably employed in respect of leaf springs 114A,B and 118A,B, which permit displacement of the stylus supporting member 112 in the X and Y direction.

Figure 7:
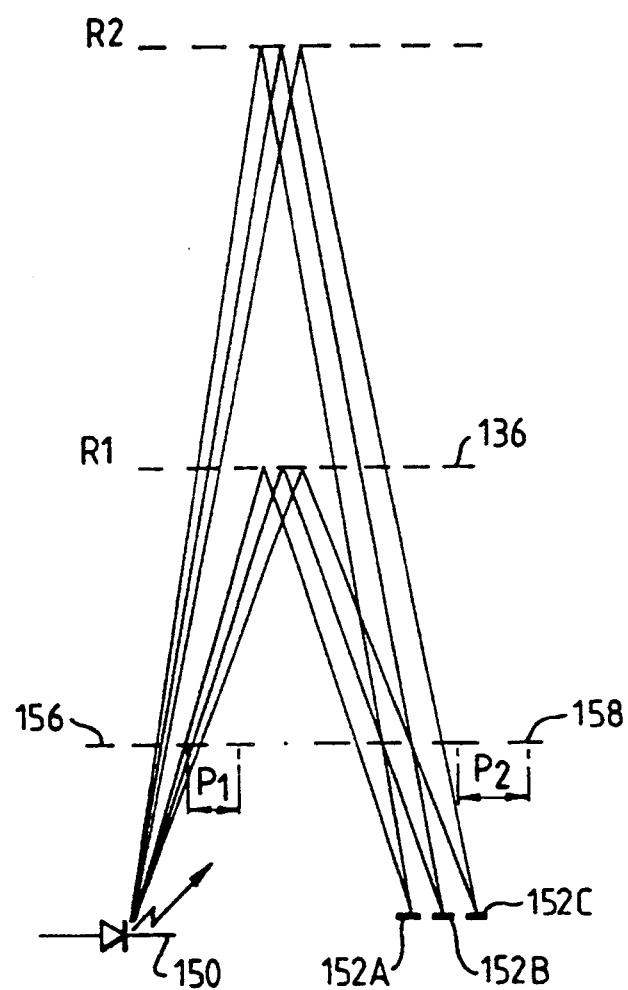
FIG. 7 is a ray tracing for FIG. 4.

Referring now to FIG. 7, the optical mechanism by which the scale and readhead transducers determine the magnitude and direction of the displacement of the cube 134 will now be described. As described in relation to FIG. 4 the readhead includes a light source 150 in register with an index grating 156, having a pitch $P_1$ Adjacent the light source 150 a detector unit 152 which includes three photosensitive detectors 152A,B,C is mounted in register with an analyser grating 158, having a pitch $P_2$ The index grating 156 and analyser grating 158 are provided on the same glass substrate, and light from the light source 150 passes through the index grating 156 and is reflected off a scale 136 to generate interference fringes, having a pitch $P_1$ in the plane of the analyser grating 158. Relative movement between the scale and the readhead in the X direction causes the fringes to move across the analyser grating 158 which effectively shutters the fringes for the photodetectors 152A,B,C. However, because the pitches of the fringes and the pitch of the analyser grating are slightly different, moiré fringes will be generated at the analyser grating 158, having a periodicity in the X-direction (i.e. the direction of spacing of the lines of the analyser grating 158). The generation of the moiré fringes is akin to the generation of a beat frequency, and thus the moiré fringes will have a pitch equal to $1/(1/P_1 - 1/P_2)$; significantly larger than the pitch of either of the gratings 156,158. The photodetectors 152A,B,C are spaced apart behind analyser 158 by approximately one third of the pitch of a moiré fringe. Upon relative movement of the scale 136 and readhead 144 each of the photodetectors 152A,B,C will generate a cyclically varying electrical signal corresponding to the light intensity modulation at the analyser grating, with the three detectors producing outputs having a phase shift of approximately 120°. These outputs may be combined to produce a pair of sinusoidally varying signals having a quadrature relationship, from which both the magnitude and direction of relative movement of the cube 134 and the fixed structure 110 in, for example, the X direction may be determined.

This arrangement of scale and readhead has significant advantages in conjunction with the probe of the present invention. Firstly, because the position of the scale 136 relative to the readhead may vary in the Y direction between the two positions indicated in FIG. 7 as R1 and R2, it is not possible to employ a more conventional arrangement in which three distinct analyser windows are provided, each having lines fractionally shifted relative to the adjacent analyser window, unless the photodetectors 152A,B,C are positioned directly behind the respective windows. This is because, due to the triangulation of the light from light source 150 to scale 136 and to analyser 158, the angle of incidence of the light through the analyser grating 158 will change with the distance between the scale 136 and the readhead. With individual analyser windows therefore, cross-talk between a given detector and light passing through the window in register with an adjacent detector may occur as the angle of incidence becomes more acute. Furthermore, because the configuration of leaf springs employed for the X and Y axes of the probe of the present invention introduces a small rotation into the movement of the stylus supporting member 112, the fringes will have a continually variable skew angle relative to the lines of the analyser grating 158. It is thus not possible to employ the classical moiré configuration where the lines of the analyser grating 158 are skewed relative to the lines of the scale in order to generate moiré fringes extending substantially perpendicular to the lines of the analyser grating 158, because the pitch of the moiré fringes would be too sensitive to variation as the skew angle varies.

Figure 8:
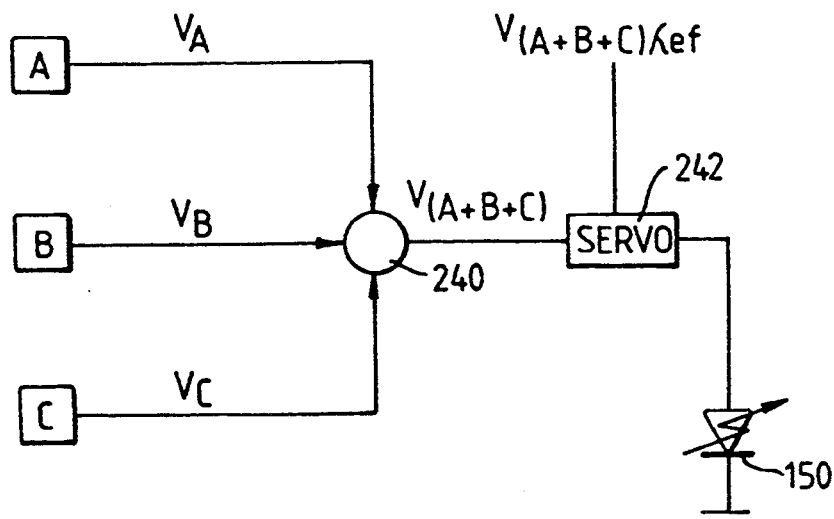
FIG. 8 is a circuit diagram for the detail of FIG. 4.

A further effect of the variation in offset between the scale 136 and the readhead is the resultant variation in the net intensity of light incident upon the photodetectors 152A,B,C. This results in a change in the magnitude of the quadrature signals, and thus requires an interpolator having a large dynamic range. To overcome this problem, the present invention provides a system which maintains a substantially constant D.C. intensity of light at the photodetectors 152A,B,C irrespective of the offset between the scale and the readhead. Referring now to FIG. 8, the detectors 152A,B,C each generate an output voltage $V_A$, $V_B$, $V_C$, and these are summed at a summing junction 240. The output of the summing junction is sent to a servo mechanism 242 which compares the output voltage from the circuit 240 with a reference voltage $V_{(A+B+C)ref}$, and passes an appropriate current through the LED 150 as a result. The LED is thus servoed such that the D.C. intensity of light at the analyser grating 158 is constant, and thus the amplitude of sinusoidal quadrature signals used to interpolate the position of the readhead relative to the scale likewise remains constant.

We claim:

1. A probe for a coordinate positioning machine, the probe including a suspension assembly comprising:
   a first, relatively fixed, member;
   a second, relatively movable, member;
   a pair of leaf springs, each leaf spring of said pair being connected to said first and second member to enable an arcuate motion of said second member in a plane extending substantially orthogonal to the plane of each of said leaf springs; wherein the distance, measured in said plane, between the leaf springs at the first member is greater than the distance, measured in said plane between the leaf springs at said second member, thereby to induce a rotation of said second member upon said arcuate motion thereof relative to the first member, said rotation having an axis orthogonal to said plane, and occurring in a sense opposite to that of said arcuate motion.

2. A probe according to claim 1, wherein the probe comprises a fixed structure, by which the probe may be mounted to a movable arm of a coordinate positioning machine, the probe further comprising at least one transducer for measuring displacement of said second member relative to said fixed structure in a direction corresponding to the direction of spacing of the leaf springs, said at least one transducer comprising:
   a scale, having a series of lines spaced apart in said direction, provided on one of the fixed structure and second member;
   an opto-electronic readhead, provided on the other of the fixed structure and second member, for reading said scale.

3. A probe according to claim 2, wherein said scale is provided on the second member.

4. A probe according to claim 3, wherein said fixed structure is provided by said first member.

* * * * *